US 6,724,347 B2

(12) United States Patent
Tomomatsu et al.

(10) Patent No.: US 6,724,347 B2
(45) Date of Patent: Apr. 20, 2004

(54) CHIP ANTENNA AND METHOD OF MANUFACTURING THE SAME

(75) Inventors: Isao Tomomatsu, Tokyo (JP); Takahiro Ueno, Tokyo (JP); Mitsuo Yoshino, Tokyo (JP); Shinji Satoh, Tokyo (JP); Hiroki Hamada, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/178,328

(22) Filed: Jun. 20, 2002

(65) Prior Publication Data

US 2003/0030593 A1 Feb. 13, 2003

(30) Foreign Application Priority Data

Jun. 25, 2001 (JP) ........................................ 2001-190939
Sep. 4, 2001 (JP) ........................................ 2001-267508
Dec. 11, 2001 (JP) ........................................ 2001-377026
Feb. 5, 2002 (JP) ........................................ 2002-028397

(51) Int. Cl.⁷ ................................................ H01Q 1/38
(52) U.S. Cl. ............................. 343/700 MS; 343/702; 343/895; 343/873
(58) Field of Search ........................ 343/700 MS, 702, 343/873, 895

(56) References Cited

U.S. PATENT DOCUMENTS

| | | | |
|---|---|---|---|
| 2,990,547 A | 6/1961 | McDougal | 343/767 |
| 5,212,494 A | 5/1993 | Hofer | 343/859 |
| 5,750,421 A | 5/1998 | Kasai et al. | 438/106 |
| 5,886,398 A | 3/1999 | Low et al. | 257/667 |
| 5,966,799 A | 10/1999 | Understiller et al. | 29/600 |
| 6,225,560 B1 | 5/2001 | Machado | 174/52.2 |
| 6,466,174 B2 * | 10/2002 | Haussler et al. | 343/702 |

FOREIGN PATENT DOCUMENTS

| | | | |
|---|---|---|---|
| EP | 0 863 570 A | 9/1998 | H01Q/1/36 |
| EP | 0 863 570 A2 | 9/1998 | H01Q/1/36 |
| EP | 0 893 841 A1 | 1/1999 | H01Q/11/08 |
| EP | 0 893 841 A | 1/1999 | H01Q/11/08 |
| EP | 1 085 597 | 3/2001 | H01Q/9/04 |
| JP | 10-107535 | 4/1998 | H01Q/13/08 |
| JP | 10 107535 A | 4/1998 | H01Q/13/08 |
| JP | 11-41019 | 2/1999 | H01Q/1/24 |
| JP | 11-78315 | 3/1999 | B42D/15/10 |
| JP | 11 078315 A | 3/1999 | B42D/15/10 |
| WO | 97 07560 | 2/1997 | H01Q/13/20 |
| WO | 99 07032 | 2/1999 | H01Q/11/08 |
| WO | WO 99/070032 | 2/1999 | H01Q/1/36 |

* cited by examiner

*Primary Examiner*—Hoang V. Nguyen
(74) *Attorney, Agent, or Firm*—Knobbe, Martens, Olson & Bear, LLP

(57) ABSTRACT

Of margins of a resin molding with an antenna element buried therein which lie around the antenna element, a margin on that side of the resin molding where a gate mark remains is made larger than margins on other sides where there is no gate mark. Particularly, when the antenna element has a line antenna portion and a capacitance-adding portion provided at a distal end of the line antenna portion, the resin molding is injection-molded in such a way that a gate mark can be formed on that side where the capacitance-adding portion is located. Those portions of the resin molding where the terminal portions are led out are dented from levels of portions around those portions. This provides a chip antenna which has a simple structure with a high mechanical strength and does not prevent separation or cracking from occurring in the resin molding in which the antenna element is buried and a method of manufacturing the chip antenna.

14 Claims, 13 Drawing Sheets

REFLOW AT 250°C × 30 sec × 3 TIMES
RESULTS OF EXPERIMENT ON OCCURRENCE
OF CRACKS (SAMPLES MOUNTED ON BOARDS)

CHIP ANTENNA AND METHOD OF MANUFACTURING THE SAME

BACKGROUND OF THE INVENTION

1. Field of the Invention

The present invention relates to a chip antenna in which an antenna element having a line antenna portion is buried in a resin molding, and a method of manufacturing the chip antenna.

2. Description of the Prior Art

One of chip antennae has a structure in which a metal antenna element having, for example, a meander line pattern shape formed thereon is buried in a resin molding. This type of chip antenna is manufactured by setting an antenna element in a mold for injection molding and then injection-molding a dielectric resin in the mold.

At this time, a gate mark originated from the injection molding of the dielectric resin in the mold for injection molding remains on the end face of the resin molding. A gate mark is undulations of about several hundred micrometers, and is negligible for ordinary resin moldings. In case of a chip antenna, however, a gate mark increases or reduces the amount of a dielectric near the antenna element and thus influences the antenna characteristics, such as the resonance frequency.

Terminal portions which are provided continuously to the antenna element protrude from the resin molding. In addition, the antenna element is simply physically contacted to the resin molding. Applying stress on the resin molding from the terminal portions is therefore likely to deform the resin molding. The deformation of the resin molding may separate the resin molding from the antenna element or cause cracks in the resin molding.

At the time the dielectric resin is injection-molded in the mold for injection molding in which the antenna element is set, the strong flow of the dielectric resin near the dielectric inlet port (gate portion) deforms, for example, a meander line pattern shape (line antenna portion), thereby changing the antenna characteristics.

SUMMARY OF THE INVENTION

Accordingly, it is an object of the present invention to provide a chip antenna whose antenna characteristics are not influenced by the state of a gate mark remaining on a resin molding, and a method of manufacturing the chip antenna.

It is another object of the present invention to provide a chip antenna which does not suffer separation of a resin molding and cracking thereon, and a method of manufacturing the chip antenna.

To achieve the objects, a chip antenna according to the present invention is characterized in that of margins of the resin molding around an antenna element buried in a resin molding, a margin on that side of the resin molding where an injection molding originated gate mark remains is larger than margins on other sides where there is no gate mark.

A "margin" of the resin molding mentioned here is an area which does not substantially overlap the antenna element at the peripheral portion of the resin molding as seen planarly. This design can set the distance from the antenna element to the gate mark longer, so that the influence of the projections or indents of the gate mark on the antenna characteristics can be decreased. It is also possible to reduce the stress applied to the interface between the antenna element and the resin molding.

Another chip antenna according to the present invention has a structure where an antenna element is buried in a resin molding having a predetermined chip shape and terminal portions provided continuously to the antenna element protrude from the resin molding. Particularly, the chip antenna is characterized in that those portions of the resin molding with the predetermined chip shape where the terminal portions are led out are dented from levels of portions around those portions.

As this structure can make larger a resin molding area (margins) around those portions of the resin molding from which the terminal portions protrude, it is possible to increase the mechanical strength for receiving the stress applied to the resin molding from the terminal portions. This can prevent separation of the resin molding and cracks from being formed thereon.

A method of manufacturing a chip antenna according to the present invention sandwiches those portions of terminal portions provided continuously to an antenna element which are led out from a resin molding between an upper die and a lower die of a mold for injection molding, positions the antenna element in a cavity of the mold and then injects a dielectric into the cavity to bury the line antenna portion with the dielectric. Particularly, the method is characterized in that those portions of the mold for injection molding which sandwich the terminal portions from above and below are the dies that are so shaped as to protrude toward the cavity.

When an antenna element has a capacitance-adding portion at a distal end of a line antenna portion, a dielectric is injected into the cavity from outward of the capacitance-adding portion as seen from a center of the antenna element. Further, when the line antenna portion of the antenna element has meander line pattern shapes with different line widths and pitches formed at both ends, the dielectric is injected into the cavity from, for example, that side of the meander line with the wide line width.

Determining the position of the injection of a dielectric into the cavity this way can prevent the antenna element from being deformed by the strong flow of the dielectric resin near the dielectric inlet port (gate portion).

DETAILED DESCRIPTION OF THE INVENTION

Preferred embodiments of the present invention will now be described referring to the accompanying drawings.

Embodiment 1A

Figure 1:
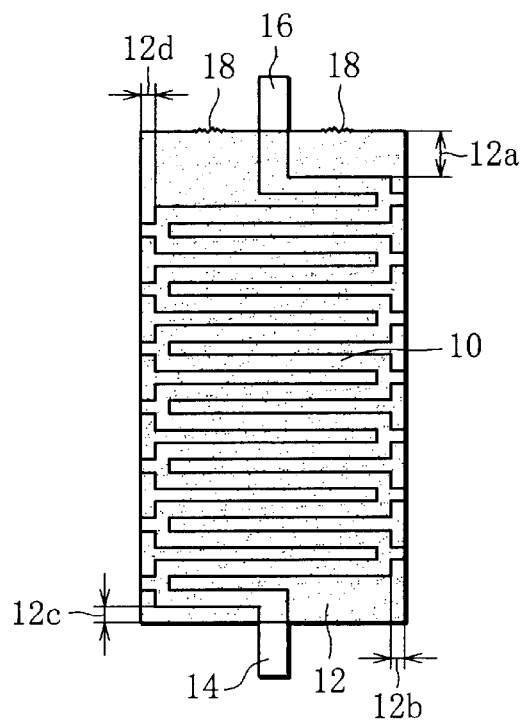
FIG. 1 is a plan view showing a chip antenna according to an embodiment 1A of the present invention.

FIG. 1 shows the schematic planar structure of a chip antenna according to one embodiment of the present invention. This chip antenna has an antenna element 10 which has a meander line pattern shape formed thereon and is buried in a resin molding 12. A power supply terminal 14 is formed at one end side of the antenna element 10 in such a way as to protrude outward from the resin molding 12. A fixed terminal 16 to a circuit board or the like is formed at the other end side of the antenna element 10 in such a way as to protrude outward from the resin molding 12.

The feature of the chip antenna lies in that of margins 12a, 12b, 12c and 12d of the resin molding 12 located around the antenna element 10, the margin 12a on one side of the resin molding 12 where there is a gate mark 18 is made larger than the margins 12b, 12c and 12d on the other side where there is no gate mark 18.

Figure 2:
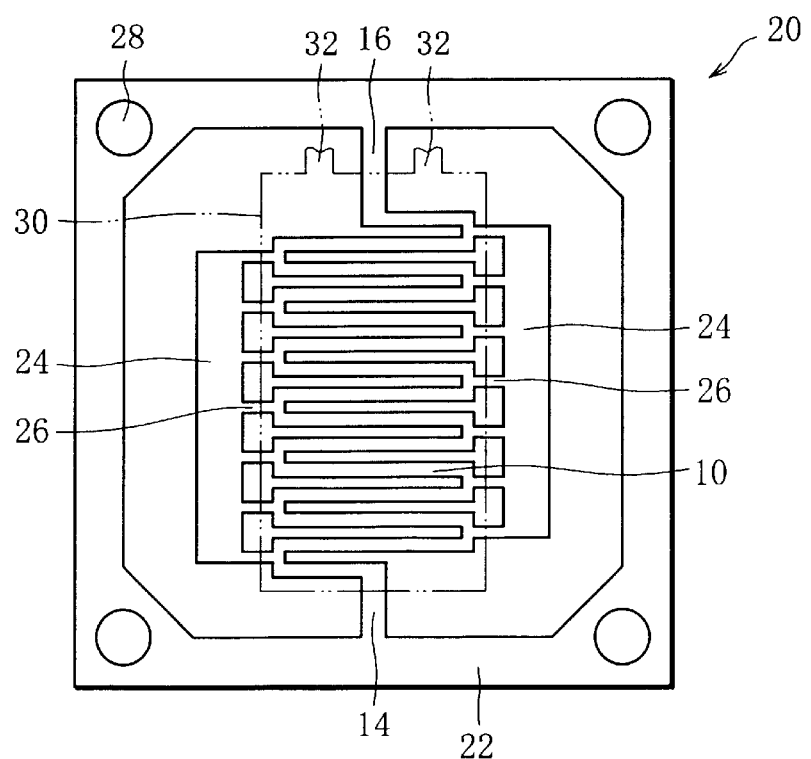
FIG. 2 is a plan view showing a conductive pattern which is used in the chip antenna in FIG. 1.

The chip antenna is manufactured as follows. First, a conductive pattern 20 as shown in FIG. 2 is formed by punching or etching a thin metal plate (e.g., a copper plate). The conductive pattern 20 is the meander antenna element 10 held in a rectangular frame 22. A side frame 24 is provided on either side of the antenna element 10 and a plurality of U turn portions on either side of the antenna element 10 are linked to the side frame 24 via respective link portions 26. This structure allows the antenna element 10 to be held in such a way as not to change the pitch of the meander pattern.

One end side of the antenna element 10 is coupled to the frame 22 via the power supply terminal 14 while the other end side is coupled to the frame 22 via the fixed terminal 16. This holds the antenna element 10 in the frame 22 at a predetermined position. Positioning holes 28 are formed in the four corners of the frame 22. The side frames 24 may be formed integral with the outer frame 22.

The conductive pattern 20 is set in an unillustrated mold for injection molding in which a dielectric resin is injection-molded. This mold has an upper die and a lower die which form a cavity 30 as indicated by a two-dot chain line in FIG. 2 and sandwiches the side frames 24 and link portions 26, 14 and 16 between the upper die and the lower die. A gate portion 32 through which a resin is injected into the cavity 30 is provided on either side of the fixed terminal 16. The cavity 30 is larger by one size than the antenna element 10 in a planar view and particularly has large space provided on that side of the gate 32, which does not overlap the antenna element 10.

Figure 3:
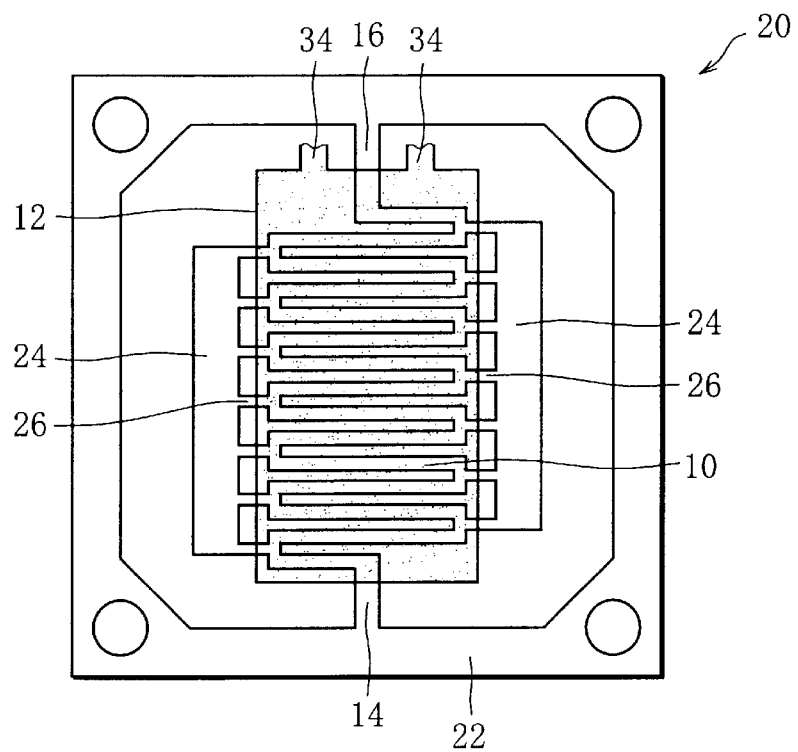
FIG. 3 is a plan view showing a resin molding attached to the conductive pattern in FIG. 2.

The injection molding of a resin in the above-described mold provides the resin molding 12 with the antenna element 10 buried therein as shown in FIG. 3. Reference number "34" denotes a gate portion projection that remains after injection molding. The gate portion projection 34 is cut, the link portions 26 are cut along the peripheral surface of the resin molding 12 and the power supply terminal 14 and the fixed terminal 16 are cut away to have proper lengths, thereby yielding the chip antenna having the structure as shown in FIG. 1.

Because the chip antenna is designed in such a way that the margin 12a on one side of the resin molding 12 where there is the gate mark 18 is made larger than the margins 12b, 12c and 12d on the other side (the minimum required), the gate mark 18 can be set apart from the antenna element 10. This can reduce a variation in the antenna characteristics caused by the projections or indents of the gate mark 18, thereby ensuring stable characteristics. The structure also reduces the influence of the stress, that is applied to the resin molding 12 when the gate portion projection 34 is cut, on the interface between the resin molding 12 and the antenna element 10. As a result, separation of the resin molding 12 from the antenna element 10 can be prevented.

Embodiment 1B

Figure 4:
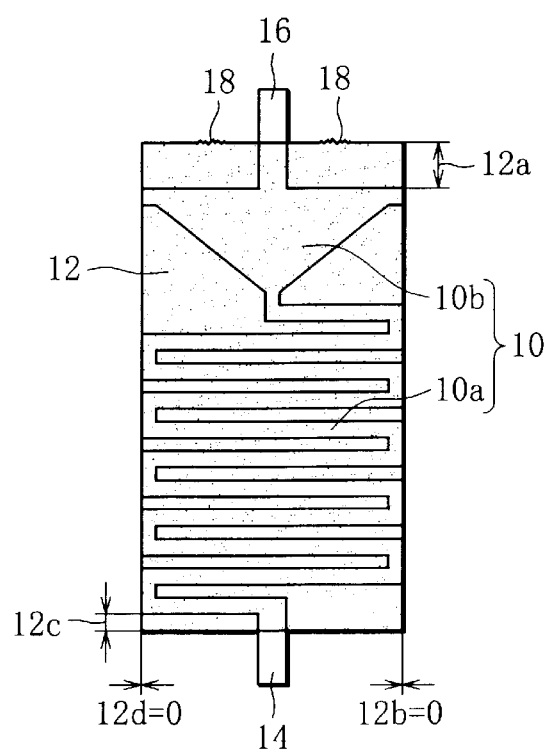
FIG. 4 is a plan view showing a chip antenna according to another embodiment 1B of the present invention.

FIG. 4 shows the schematic structure of a chip antenna according to another embodiment of the present invention. This chip antenna likewise has the antenna element 10 buried in the planar resin molding 12. The antenna element 10 is however designed so as to have a meander line pattern portion 10a and a nearly triangular capacitance-adding portion 10b provided continuously to the distal end of the line pattern portion 10a. The power supply terminal 14 protruding outward from the resin molding 12 is formed at the proximal end of the line pattern portion 10a. The fixed terminal 16 is formed at the center of the distal edge of the capacitance-adding portion 10b.

One feature of the chip antenna lies in that the resin molding 12 is formed in such a way that the gate mark 18 is made one side of the antenna element 10 on that side of the capacitance-adding portion lob. Further, the width of the resin molding 12 is made equal to the width of the antenna element 10 and the margins 12b and 12d of the resin molding 12 on both sides of the resin molding 12 are set to 0. A further feature lies in that the margin 12a on one side of the resin molding 12 where there is the gate mark 18 is made larger than the margin 12c on the other side where there is no gate mark 18.

Figure 5:
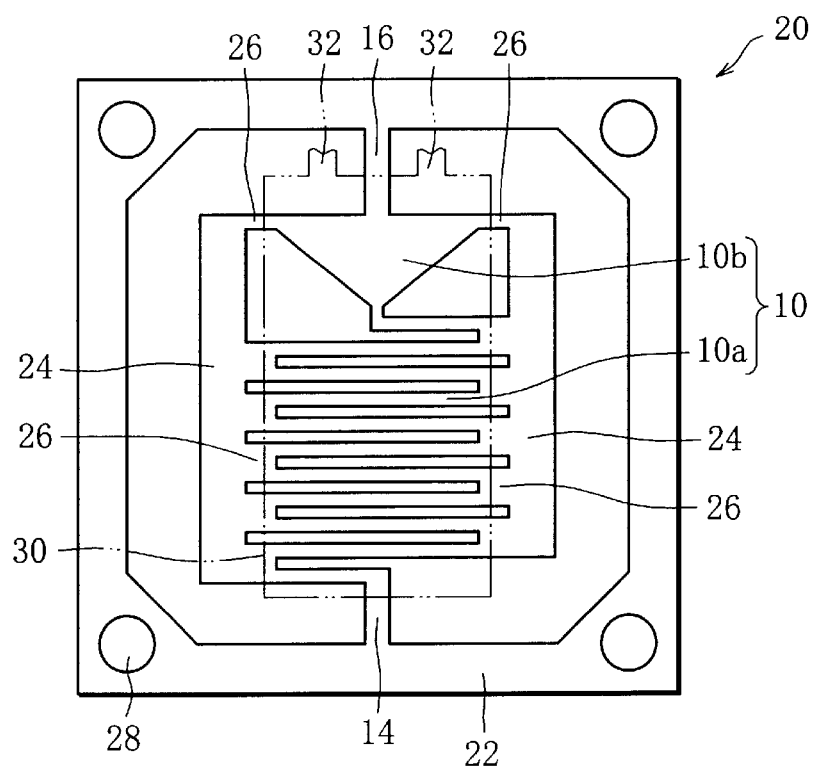
FIG. 5 is a plan view showing a conductive pattern which is used in the chip antenna in FIG. 4.

The chip antenna with such a structure is manufactured as follows. First, the conductive pattern 20 as shown in FIG. 5 is formed. This conductive pattern 20 differs from the conductive pattern 20 in FIG. 2 in that the antenna element 10 has the capacitance-adding portion 10b provided at the distal end of the meander line pattern portion 10a as mentioned above. The width of the link portions 26 that link the U turn portions of the capacitance-adding portion lob to the side frames 24 is set equal to the width of the U turn portions. Both sides of the capacitance-adding portion 10b are coupled to the side frames 24 via the link portions 26 and the center portion of the distal edge of the capacitance-adding portion 10b is coupled to the frame 22 via the fixed terminal 16. Because the other portions are the same as those of the conductive pattern 20 in FIG. 2, same reference numbers are given to the same or corresponding portions.

Figure 6:
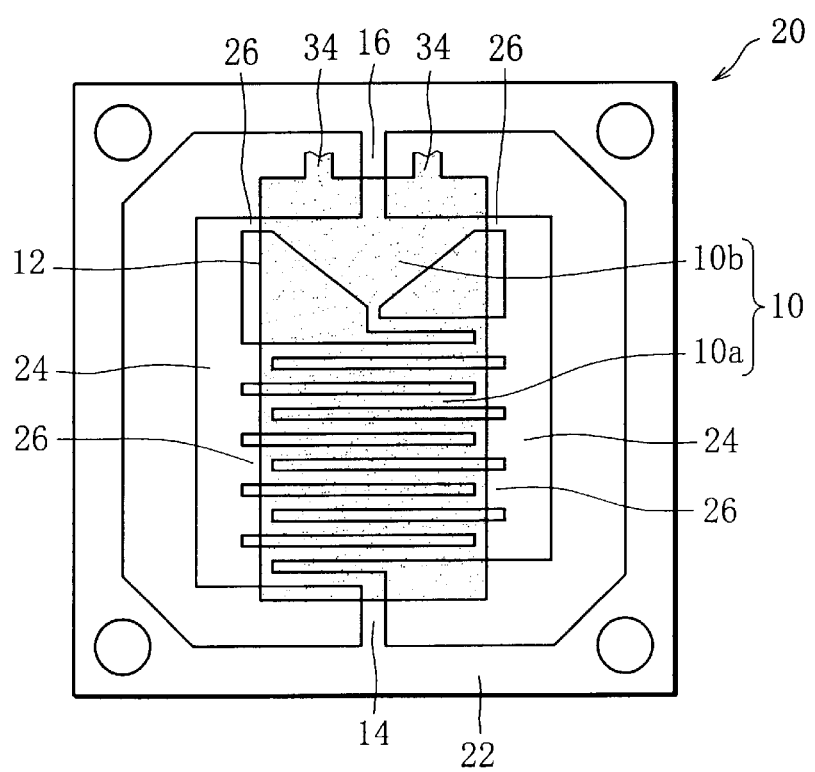
FIG. 6 is a plan view showing a resin molding attached to the conductive pattern in FIG. 5.

The conductive pattern 20 is set in a mold for injection molding in which a dielectric resin is injection-molded. As the mold is opened after injection molding of the dielectric resin, the resin molding 12 having the antenna element 10 buried therein as shown in FIG. 6 is acquired. Then, the gate portion projection 34 is cut, the link portions 26 are cut along the peripheral surface of the resin molding 12 and the power supply terminal 14 and the fixed terminal 16 are cut away to proper lengths, thereby yielding the chip antenna as shown in FIG. 4.

Because the chip antenna is designed in such a way that the margin 12a on one side of the resin molding 12 where there is the gate mark 18 is made larger than the margins 12b, 12c and 12d on the other side, it is possible to make the distance between the antenna element 10 and the gate mark 18 greater. Therefore, the embodiment 1B has the same advantage as the embodiment 1A.

The capacitance-adding portion 10b has a larger area than the line pattern portion 10a and is less likely to be deformed. Accordingly, the resin molding 12 is injection-molded in such a way that the gate mark 18 is formed on one side of the antenna element 10 on that side of the capacitance-adding portion 10b. At the time of injection molding, therefore, the strong flow of the resin near the gate is rectified by the capacitance-adding portion 10b having a large area, thus making it difficult to deform the antenna element 10 near the gate. As a result, the chip antenna with more stable characteristics is obtained.

In this embodiment, the capacitance-adding portion 10b is contacted at both sides to the side frames 24 and contacted at the center portion to the frame 22. That is, the antenna element 10 is supported in a T shape at three points of the frame 22. The gate is provided in such a way as to lie along the vertical line of the T shape or in such a way that the resin is injected from the direction along the link portions 26. It is therefore possible to restrain the deformation of the capacitance-adding portion 10b itself at the time of injection molding of the dielectric resin.

Embodiment 1C

The foregoing descriptions of the embodiments have been given of the case where the antenna element 10 is buried in the resin molding 12. The antenna element 10 can however be constructed to be integral with the surface of the resin molding 12. In this case, the mold for injection molding that is used to provide the resin molding 12 should have a cavity formed in only one of the upper die and the lower die and the antenna element 10 should be set on the surface of the other die where there is no cavity at the time of injection molding is carried out.

Embodiment 1D

Although the embodiments have been illustrated as having a side gate, a submarine gate or the like may be used which is cut at the same time as a molding is removed.

According to the individual embodiments of the present invention, as described above, of the margins of the resin molding 12 located around the antenna element 10, the margin on one side of the resin molding 12 where there is the gate mark 18 is made larger than the margins on the other side where there is no gate mark, so that the distance from the antenna element 10 to the gate mark 18 can be set large. This can reduce the influence of the projections or indents of the gate mark 18 on the antenna characteristics to make stable the antenna characteristics. It is also possible to reduce the stress applied to the interface between the resin molding 12 and the antenna element 10 at the time of cutting the gate portion projection 34. This can effectively prevent separation of the resin molding 12 from the antenna element 10.

In case where the dielectric resin is injected into the cavity 30 of the mold for injection molding to bury the antenna element 10, the flow of the dielectric resin may deform the antenna element 10. When the line pattern portion 10a of the antenna element 10 has a meander line, particularly, the line pattern portion 10a is likely to deform, thus changing the antenna characteristics. In manufacturing this type of chip antenna, therefore, it is preferable to take the following procedures.

Embodiment 2A

Figure 7:
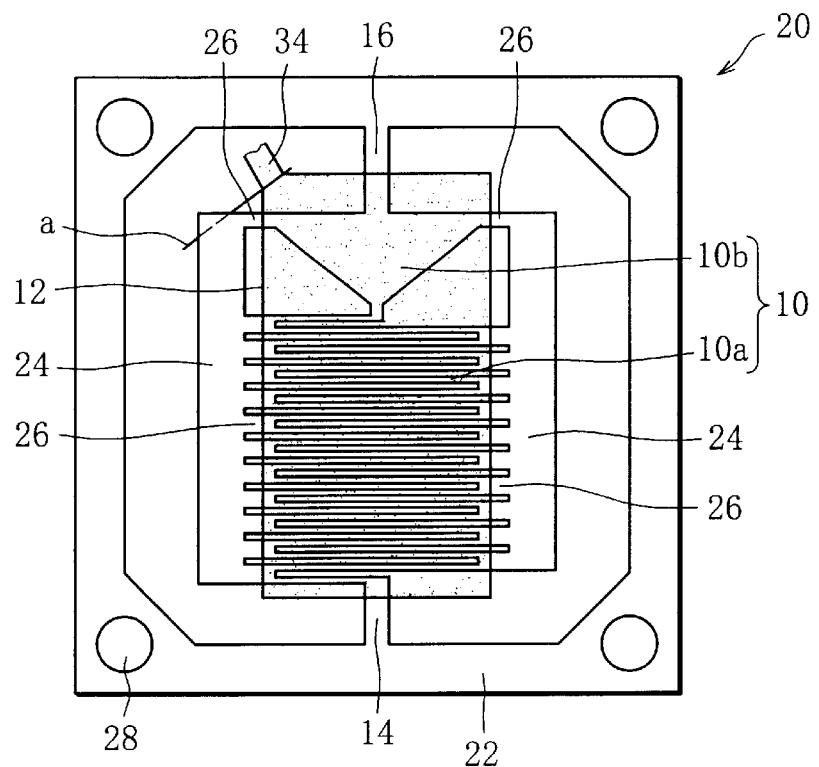
FIG. 7 is a plan view for explaining a different embodiment 2A of the present invention.

FIG. 7 shows such a preferable embodiment. According to the embodiment, the gate portion 32 through which a dielectric material is injected into the cavity of the mold is provided at a corner of the cavity on the distal edge of the capacitance-adding portion 10b and injection molding is executed using the gate portion 32. Therefore, the gate portion projection 34 is formed at the corresponding corner of the dielectric molding 12. Because the other portions are the same as those of the embodiment 1A, same reference numbers are given to the same or corresponding portions of the embodiment 2A.

If the gate portion projection 34 is formed at the end face of the dielectric molding 12 as per the embodiment 1A, the gate mark 18 may remain protruding when the gate portion projection 34 is cut. This results in a variation in the length of the dielectric molding 12. Forming the gate portion projection 34 at a corner of the dielectric molding 12 as in the embodiment 2A can however allow, for example, the gate portion projection 34 to be cut askew. Cutting the gate portion projection 34 this way can keep the length and width of the dielectric molding 12 at constant sizes with the corner of the dielectric molding 12 slightly chipped.

Embodiment 2B

Figure 8:
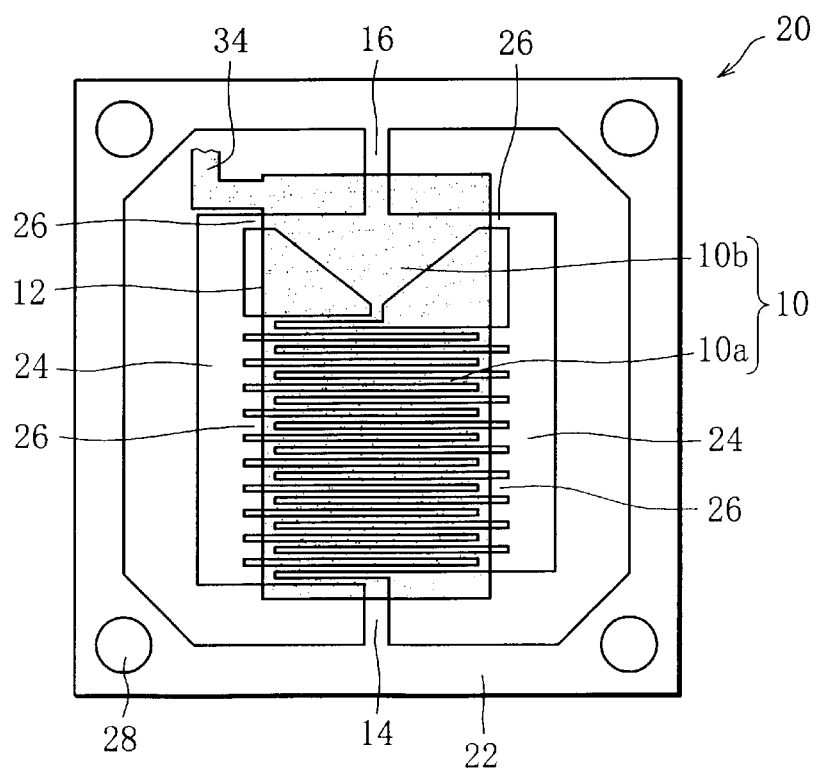
FIG. 8 is a plan view for explaining a further embodiment 2B of the present invention.

FIG. 8 shows another embodiment of the present invention. According to the embodiment, the gate portion 32 through which a dielectric material is injected into the cavity 30 of the mold is provided at a side of the cavity 30 which is located farther than the distal edge of the capacitance-adding portion 10b and injection molding is executed using the gate portion 32. In this case, the gate portion projection 34 is formed on the corresponding side of the dielectric molding 12. Because the other portions are the same as those of the embodiment 2A, same reference numbers are given to the same or corresponding portions of the embodiment 2A.

Embodiment 2C

Figure 9:
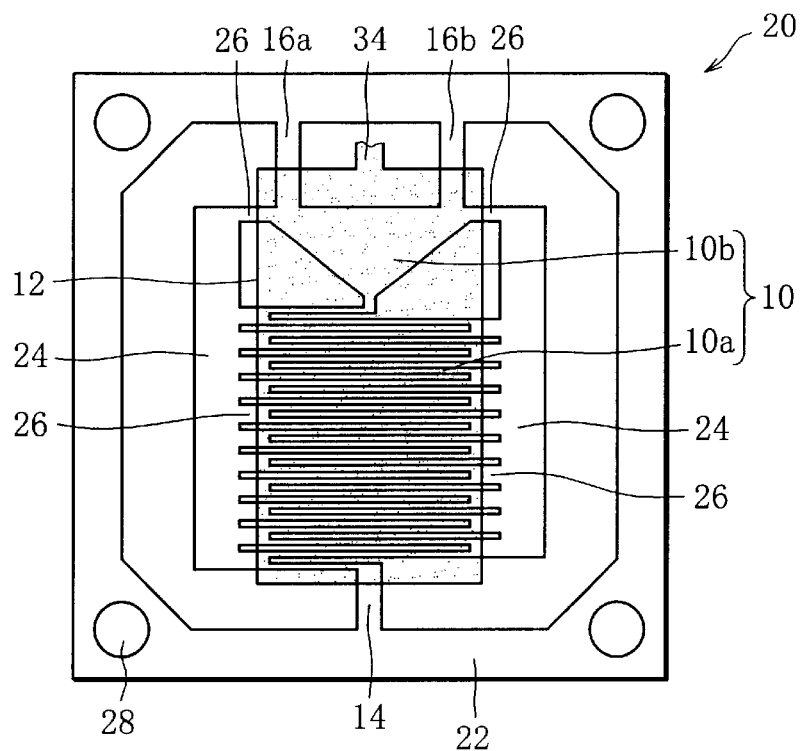
FIG. 9 is a plan view for explaining a still further embodiment 2C of the present invention.

FIG. 9 shows a further embodiment of the present invention. According to the embodiment, the line pattern portion 10a is provided with two link portions (fixed terminals 16a and 16b) that link the distal edge of the capacitance-adding portion 10b to the frame 22 and the gate portion 32 of the mold is provided between the two link portions for injection molding. In this case, a single gate portion projection 34 is formed at the center portion of the end face of the dielectric molding 12. Since the other portions are the same as those of the embodiment 2A, same reference numbers are given to the same or corresponding portions of the embodiment 2C.

Embodiment 2D

Figure 10:
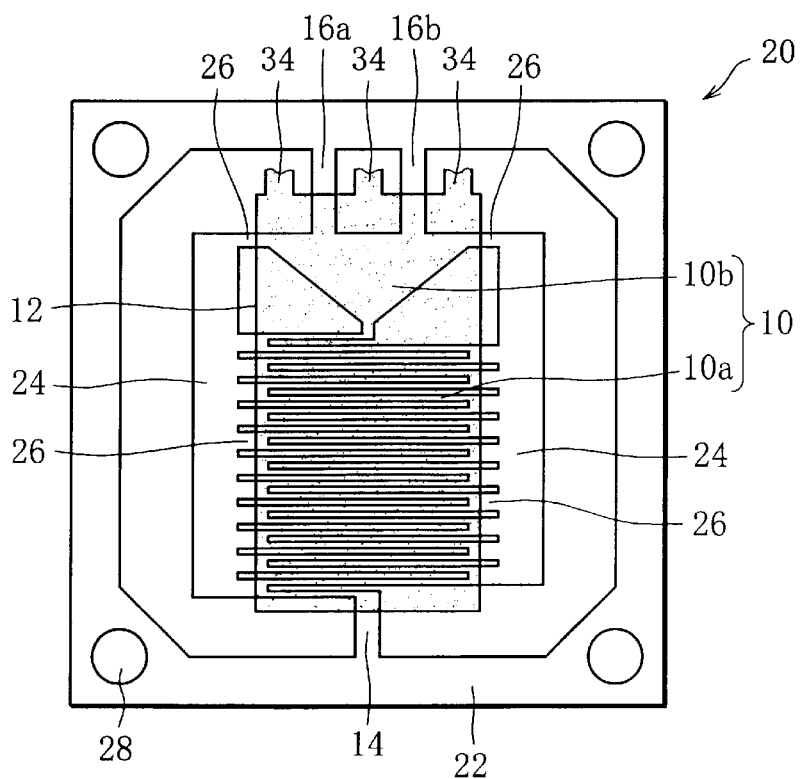
FIG. 10 is a plan view for explaining a yet still further embodiment 2D of the present invention.

FIG. 10 shows a still further embodiment of the present invention. According to the embodiment, the line pattern portion 10a is provided with two link portions (fixed terminals 16a and 16b) that link the distal edge of the capacitance-adding portion 10b to the frame 22 and the gate portion 32 of the mold is provided between the two link portions and on both sides thereof for injection molding. In this case, three gate portion projections 34 are formed on the end face of the dielectric molding 12. Since the other portions are the same as those of the embodiment 2C, same reference numbers are given to the same or corresponding portions of the embodiment 2D.

Embodiment 2E

Figure 11:
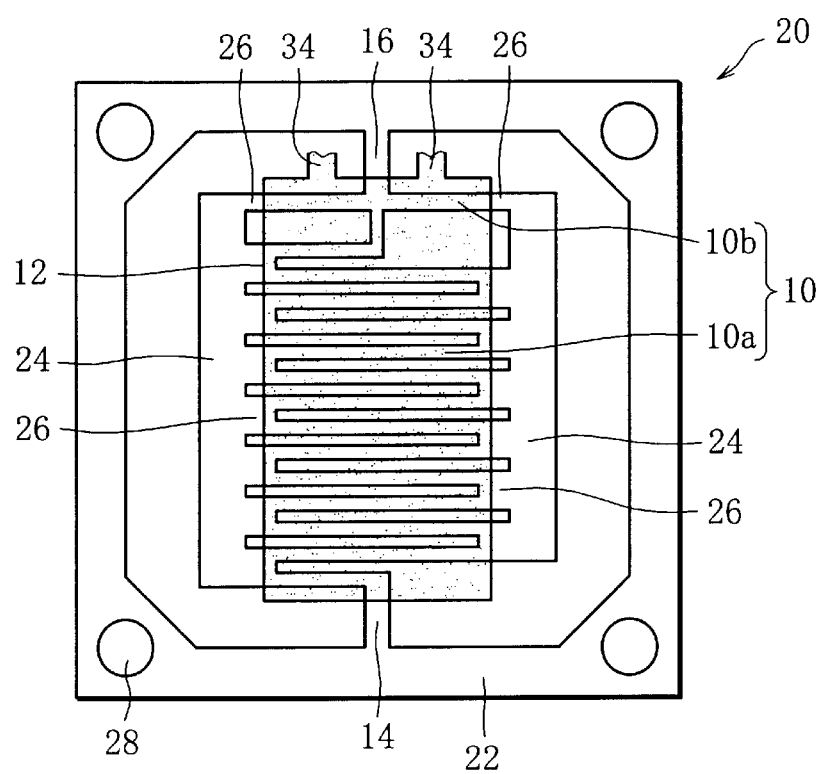
FIG. 11 is a plan view for explaining a yet still further embodiment 2E of the present invention.

FIG. 11 shows a yet still further embodiment of the present invention., According to the embodiment, the capacitance-adding portion 10b is formed in a long and narrow stripe. Because the other portions are the same as those of the embodiment 2A, same reference numbers are given to the same or corresponding portions of the embodiment 2E to omit the redundant description. Even if the shape of the capacitance-adding portion 10b is changed this way, the chip antenna can be manufactured in the same manner as done in the embodiment 1A. In the embodiment, the gate portion 32 may be provided at a position corresponding to a corner of the dielectric molding 12 as per the embodiment 2A.

Embodiment 2F

Figure 12:
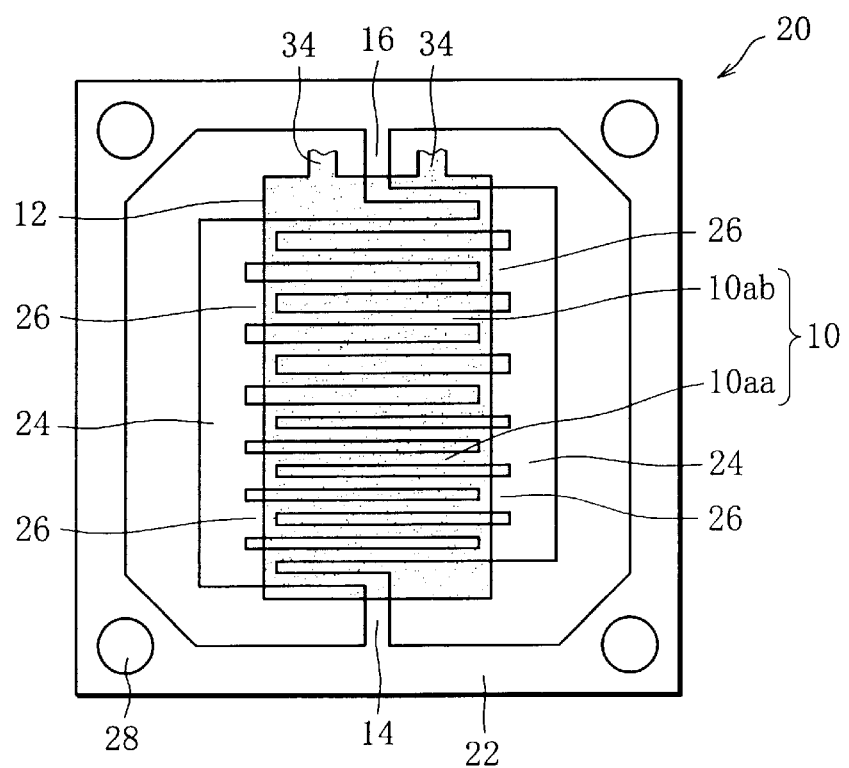
FIG. 12 is a plan view for explaining a yet still further embodiment 2F of the present invention.

FIG. 12 shows a yet still further embodiment of the present invention. According to the embodiment, the antenna element 10 comprises a line pattern portion 10aa with a narrow pitch and a line pattern portion 10ab with a wide pitch. A dielectric material is injected from both sides of link portion (fixed terminal 16) which links the end portion of the line pattern portion 10ab with a wide pitch to the frame 22 to form the dielectric molding 12. Because the other portions are the same as those of the embodiment 2A, same reference numbers are given to the same or corresponding portions of the embodiment 2F to omit the redundant description.

In the embodiment, as the line pattern portion 10aa and the line pattern portion 10ab have the same width, the line pattern portions have the same likeliness to be deformed by the flow of the dielectric material. Even with the same amount of deformation, however, the line pattern portion 10ab with a wide pitch less influences the antenna characteristics. Therefore, a chip antenna having a small variation in characteristics is manufactured by injecting a dielectric material from that side of the line pattern portion 10ab with a wide pitch in the embodiment. In the embodiment too, the gate portion 32 may be provided at a position corresponding to a corner of the dielectric molding 12 as per the embodiment 2A.

Embodiment 2G

Figure 13:
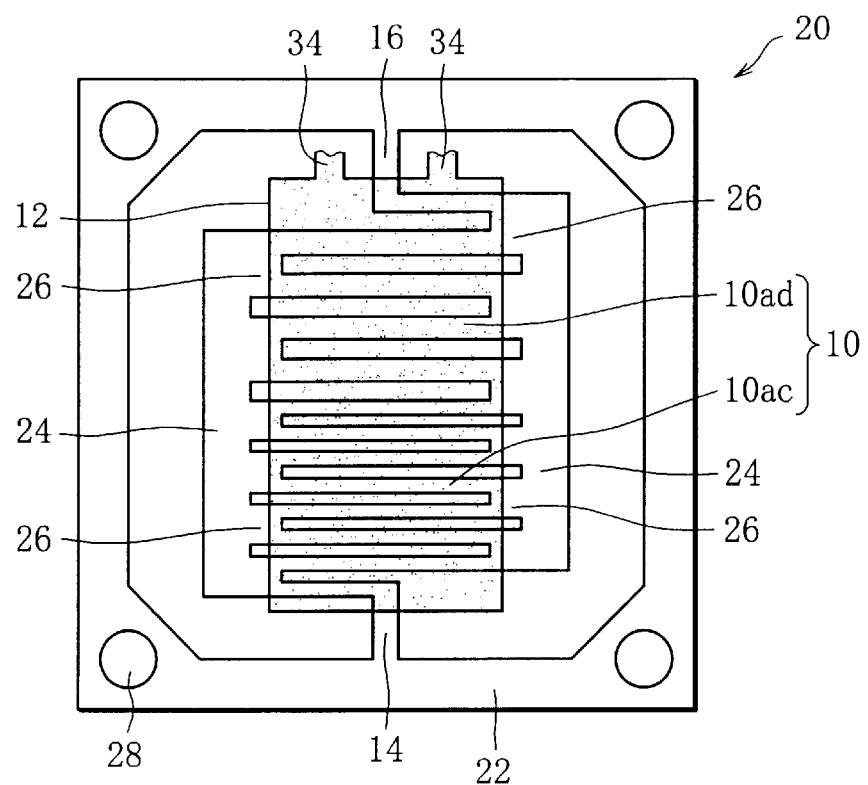
FIG. 13 is a plan view for explaining a yet still further embodiment 2G of the present invention.

FIG. 13 shows a yet still further embodiment of the present invention. According to the embodiment, the antenna element 10 comprises a line pattern portion 10ac with a narrow width and a line pattern portion 10ad with a wide width. A dielectric material is injected from both sides of link portion (fixed terminal 16) which links the end portion of the line pattern portion 10ad with a wide width to the frame 22 to form the dielectric molding 12. Because the other portions are the same as those of the embodiment 2A, same reference numbers are given to the same or corresponding portions of the embodiment 2G to avoid the redundant description.

In case where the width of the line pattern portion 10ac differs from the width of the line pattern portion 10ad, the one with a wider width has a larger deformation resistance against the flow of the dielectric material. In the embodiment, therefore, the dielectric material is injected from that side of the line pattern portion 10ad with a wide width to reduce the amounts of deformation of the line pattern portions 10ac and 10ad, thereby decreasing a variation in the characteristics of the chip antenna. As the line pattern portion 10ad with a wide width has a greater pitch than the line pattern portion 10ac with a narrow width in the embodiment, a variation in characteristics can be reduced further.

In the embodiment too, a gate portion may be provided at a position corresponding to a corner of the dielectric molding 12 as per the embodiment 2A.

Embodiment 2H

Figure 14:
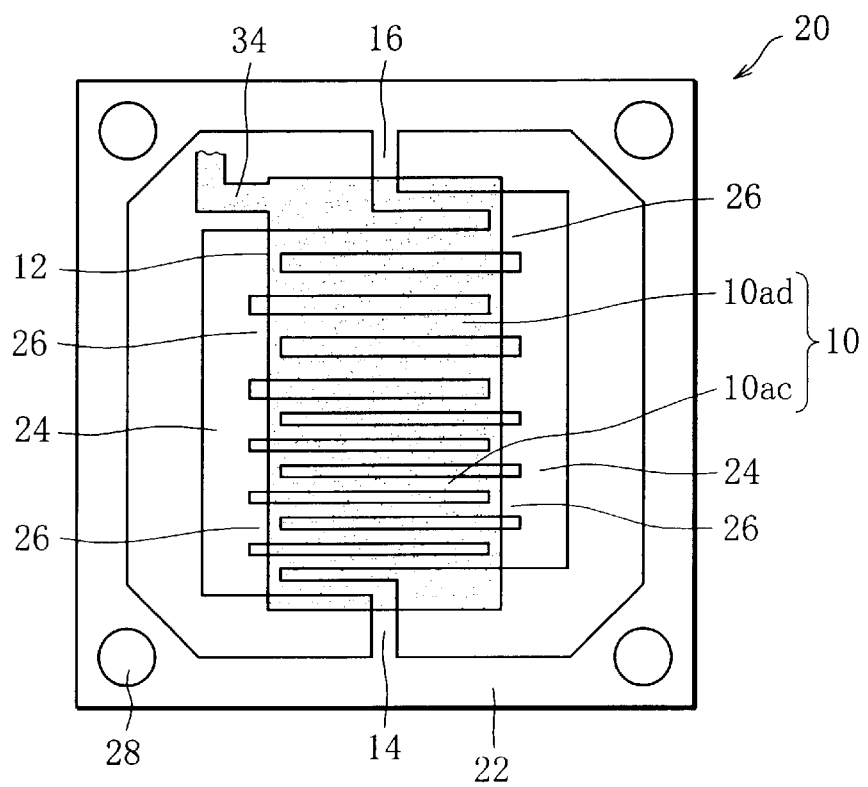
FIG. 14 is a plan view for explaining a yet still further embodiment 2H of the present invention.

FIG. 14 shows a yet still further embodiment of the present invention. According to the embodiment, the pattern of the antenna element 10 is made identical to that of the embodiment 2G and the dielectric molding 12 is formed by injecting a dielectric material from the end-face side surface of the line pattern portion 10ad with a wide width. In this case, the gate portion projection 34 is formed on the side of the dielectric molding 12. Because the other portions are the same as those of the embodiment 2G, same reference numbers are given to the same or corresponding portions of the embodiment 2H to avoid the redundant description.

Although the foregoing descriptions of the individual embodiments have been given of the case of manufacturing a chip antenna which has a dielectric deposited on the top and bottom surfaces of the antenna element 10, the dielectric may be deposited on only one of the sides of the antenna element 10.

According to the individual embodiments of the present invention, as described above, the deformation of the line pattern portion 10a like a meander pattern can be suppressed in case of manufacturing a chip antenna which has a dielectric material deposited on the antenna element 10 that has the line pattern portion 10a. It is therefore possible to manufacture a chip antenna with stable characteristics. In this case, it is preferable to use a synthetic resin, a composite material of a synthetic resin and ceramics as the material for a resin molding.

In the chip antenna that has the power supply terminal 14 and fixed terminal 16 protruding from the edge portions of the resin molding 12, the stress applied to the power supply terminal 14 or the fixed terminal 16 may deform the resin molding 12. Particularly, as the antenna element 10 and the resin molding 12 are contacted together simply physically, the deformation of the resin molding 12 is likely to separate the antenna element 10 from the resin molding 12 or form cracks at the portion where the power supply terminal 14 or the fixed terminal 16 protrudes.

To avoid such a shortcoming, it is preferable that the chip antenna should have the following structures.

Embodiment 3A

Figure 15:
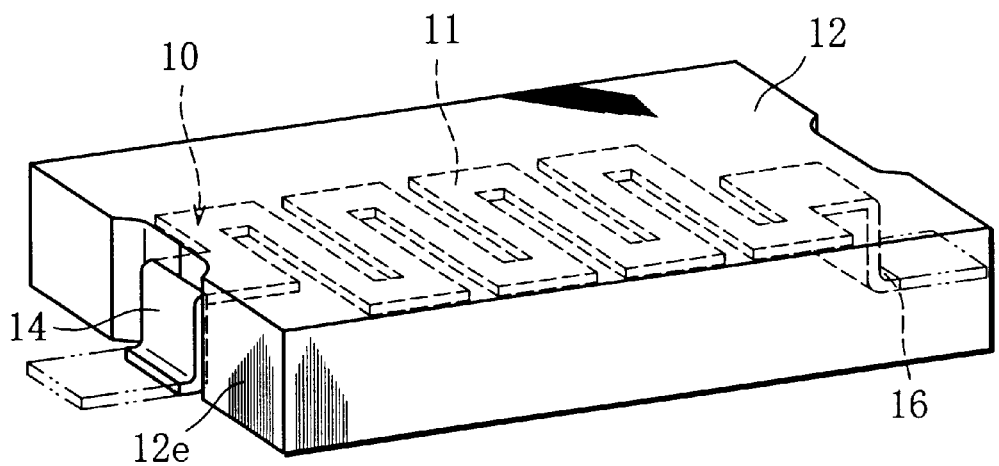
FIG. 15 is a perspective view depicting a chip antenna according to a yet still further embodiment 3A of the present invention.
Figure 16:
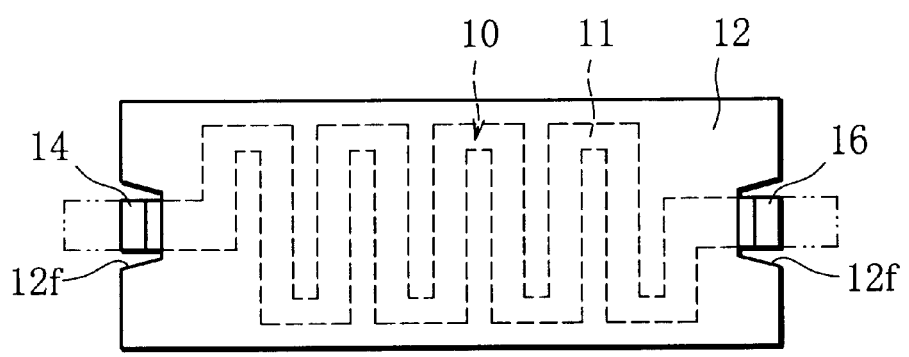
FIG. 16 is a diagram illustrating the planar structure of the chip antenna shown in FIG. 15.
Figure 17:
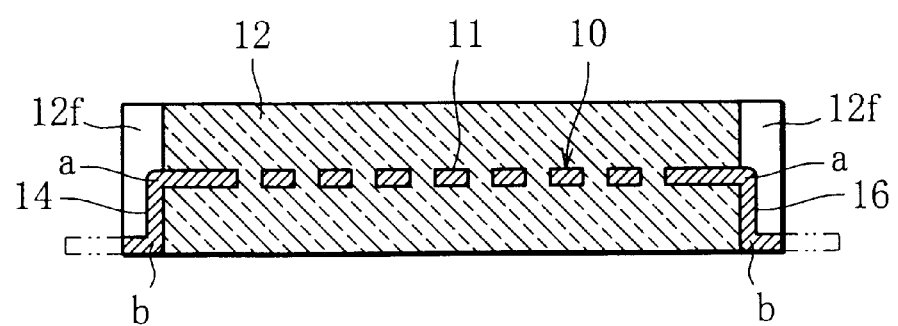
FIG. 17 is a diagram illustrating the cross-sectional structure of the chip antenna shown in FIG. 15.

FIG. 15 is a perspective view depicting a chip antenna according to this embodiment. FIG. 16 is a plan view of the chip antenna shown in FIG. 15 and FIG. 17 is a diagram illustrating the cross-sectional structure of the chip antenna. The chip antenna basically has the antenna element 10 that comprises the meander line antenna portion 10a and terminal portions 14 and 16 provided continuously to the end portions of the line antenna portion 10a. The resin molding 12 takes the shape of an approximately parallelepiped in which the line antenna portion 10a of the antenna element 10 is buried, and has the terminal portions 14 and 16 led out from the respective end portions. The resin molding 12 is formed of a dielectric which has a synthetic resin and ceramics powder blended.

The line antenna portion 10a comprises parallel lines that meander through several U turns as shown in, for example, FIG. 16 are provided with a predetermined pitch by patterning a predetermined conductive plate by punching, etching or the like. Specifically, the line antenna portion 10a is a conductive plate of, for example, 100 μm in thickness patterned to have 30 turns of line conductors which has a conductor width (line width) of 0.18 mm, a meander width of 8.7 mm and a meander pitch of 0.4 mm.

The terminal portions 14 and 16 are those portions which extend from the end portions of the line antenna portion 10a over a predetermined length in the lengthwise direction of the line antenna portion 10a. In the embodiment, particularly, the terminal portions 14 and 16 are bent downward in an L shape at the positions (first bending point a) where they are led out from the end portions of the resin molding 12 and are further bent outward in an L shape at the positions (second bending point b) where the attachment height of the line antenna portion 10a is defined, and thereby serve as hook-like legs of the line antenna portion 10a, as shown in FIG. 17. Immediately after the resin molding 12 is formed, the terminal portions 14 and 16 serving as such legs are set longer than the length (terminal length) finally needed by the chip antenna, as indicated by two-dot chain lines in FIGS. 15 to 17. That is, the terminal portions 14 and 16 are cut to given lengths as needed after the line antenna portion 10a of the antenna element 10 is buried in the resin molding 12 or it is produced as a chip antenna. In the embodiment, the lengths of the terminal portions 14 and 16 are set level with the end faces, 12e, of the resin molding 12.

As shown in FIGS. 16 and 17, the resin molding 12 has a chip shape of an approximately parallelepiped in the center of which the line antenna portion 10a is buried along the antenna pattern surface formed by the line antenna portion 10a and from the end faces of which the terminal portions 14 and 16 are led out. The chip antenna with an approximately parallelepiped shape which has the line antenna portion 10a of the antenna element 10 buried in the resin molding 12 is realized as approximately having a width of 9.0 mm, a length of 16 mm and a thickness of 1.2 mm.

The chip antenna according to the embodiment is characterized in that the center portions of the end faces 12e of the resin molding 12 from which the terminal portions 14 and 16 are led out are dented from the levels of those around the center portions. That is, the center portions of the end faces 12e of the resin molding 12 from which the terminal portions 14 and 16 are led out are groove-like recesses 12f extending in the up and down direction and are dented from the levels of those around the recesses 12f. The terminal portions 14 and 16 of the antenna element 10 are led out from the bottoms of the recesses 12f. In other words, the end faces 12e of the resin molding 12 have such shapes that those areas around the portions (recesses) 12f from which the terminal portions 14 and 16 are led out extend out from the levels of the portions 12f. The peripheral protruding portions of the terminal portions 14 and 16 form wide dielectric areas that are not separated to upper and lower portions by the antenna element 10. The terminal portions 14 and 16 are cut at positions level with the end faces 12e of the resin molding 12 that are positioned on both sides of the terminal portions 14 and 16.

Figure 18:
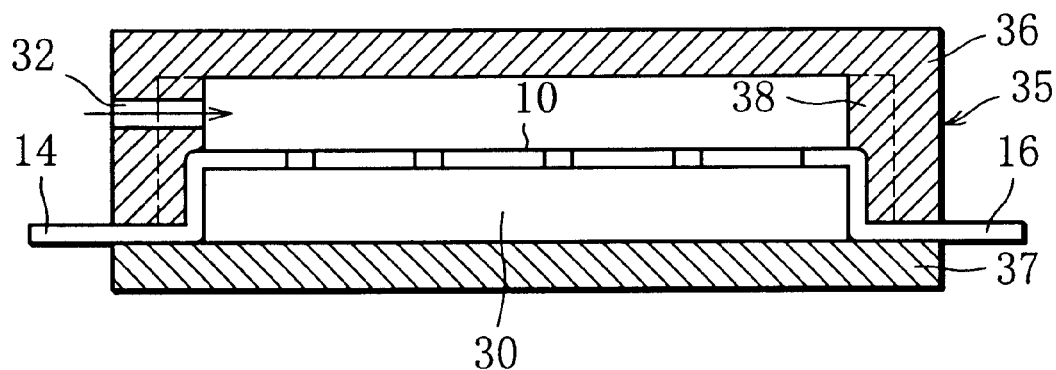
FIG. 18 is a diagram showing the cross-sectional structure of a mold for dielectric injection molding which is used to manufacture the chip antenna shown in FIG. 15 and an antenna element set in the mold.
Figure 19:
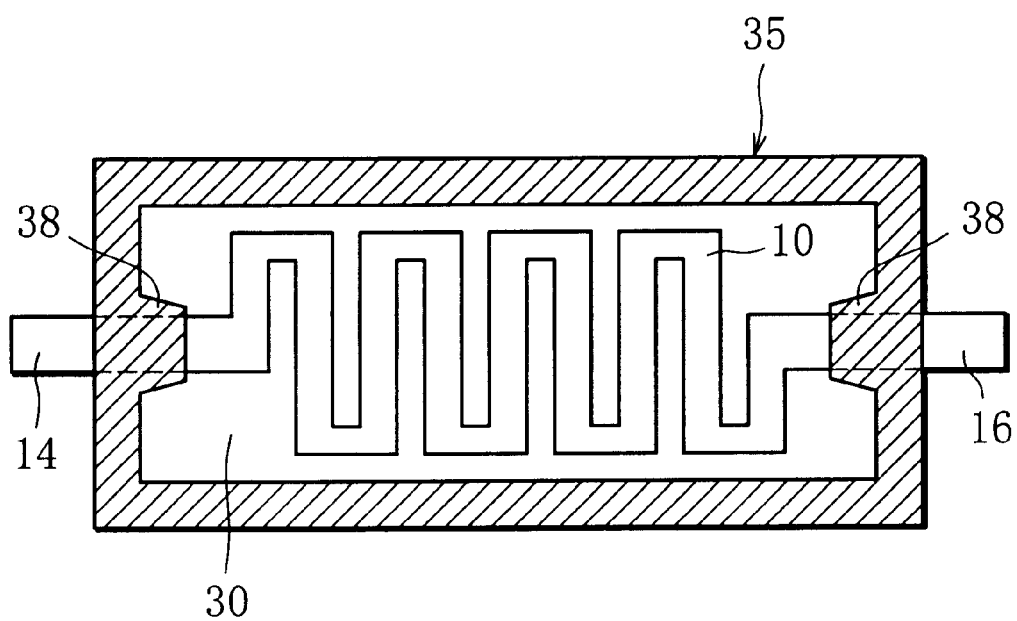
FIG. 19 is a cross-sectional view showing the planar structure of the mold for dielectric injection molding shown in FIG. 18.

The shapes of the end faces of the resin molding 12 are formed by using a mold 35 for dielectric injection molding which, for example, has a cross-sectional structure as shown in FIG. 18 and a planar structure as shown in FIG. 19. The mold 35 for dielectric injection molding schematically comprises a pair of an upper die 36 and a lower die 37 which forms inside the cavity 30 of an approximately parallelepiped shape that defines the outer shape of the resin molding 12 of the chip antenna. The antenna element 10 is held in the inner space. The holding of the antenna element 10 by the mold 35 is accomplished by sandwiching those portions of the terminal portions 14 and 16 which are led out from the resin molding 12, specifically, the hook-like legs that are bent outward in an L shape at the second bending point b to define the attachment height of the line antenna portion 10a, between the upper die 36 and the lower die 37. Particularly, the portions of the mold 35 that sandwich the legs from above and below are provided as projections 38 which form wall surfaces protruding toward the cavity 30 of the mold 35 and are positioned at the top and bottom surfaces of the legs (terminal portions 14 and 16).

With the legs (terminal portions 14 and 16) sandwiched from above and below to hold the antenna element 10 inside (cavity 30) the mold 35, a dielectric is injected through the gate (dielectric inlet port) 32 of the mold 35. As a result, the line antenna portion 1a of the antenna element 10 is buried inside by the injected dielectric. At this time, the dielectric is prevented from going around the legs (terminal portions 14 and 16) sandwiched by the projections 38. As a result, the legs (terminal portions 14 and 16) are led out from the end faces of the resin molding 12 molded by using the mold 35. Then, the areas of those portions of the end faces of the resin molding 12 from which the terminal portions 14 and 16 are led out make the recesses 12f formed by the projections 38.

According to the chip antenna that is manufactured by sandwiching the terminal portions 14 and 16 in the mold 35 and burying the line antenna portion 10a with a dielectric in this state, as mentioned above, the terminal portions 14 and 16 of the antenna element 10 are led out from the recesses 12f dented inward from the levels of the end faces 12e of the resin molding 12. Even in case where an attempt is made to make the chip antenna smaller by restricting the outside dimensions of the entire chip antenna, therefore, the terminal portions 14 and 16 extending from the end faces of the resin molding 12 do not interfere. Because the lengths of the soldering surfaces of the terminal portions 14 and 16 can be made longer by the amounts of depression of the recesses 12f of the resin molding 12, it is possible to secure the adequate strength of the soldered junction.

Because those of the end faces of the resin molding 12 other than the areas from which the terminal portions 14 and 16 are led out can be made to protrude outward, the dielectric areas around the terminal portions 14 and 16, particularly, at the corner portions of the resin molding 12 can be made wider. What is more, the line antenna portion 10a of the antenna element 10 is not buried in the corner portions of the resin molding 12. This can strengthen the junction between the upper dielectric layer positioned on the top side of the antenna element 10 and the lower dielectric layer positioned on the bottom side of the antenna element 10. Rather, the dielectric layers at the corner portions can be made integral that cannot be separated by the antenna element 10. It is therefore possible to sufficiently enhance the mechanical strength. Even if external force is applied to the terminal portions 14 and 16 led out from the end faces of the resin molding 12, therefore, it is possible to effectively prevent the resin molding 12 from being separated upward or downward from the corner portions.

Further, the terminal portions 14 and 16 of the antenna element 10 that are led out from the end faces of the resin molding 12 are sandwiched by the top and bottom surfaces of the mold 35 (projections 38) at the time of manufacturing the chip antenna. This prevents the dielectric from going around to the surfaces of the terminal portions 14 and 16. Even in case where the terminal portions 14 and 16 that are led out from the resin molding 12 are shortened to make the chip antenna smaller, sufficiently high solderability of the terminal portions 14 and 16 can be maintained. As mentioned above, the lengths (terminal lengths) of the terminal portions 14 and 16 that are led out from the resin molding 12 can be adjusted at the time the terminal portions 14 and 16 are cut at the levels of the end faces of the resin molding 12 after the chip antenna is manufactured by burying the antenna element 10 in the resin molding 12.

Because the line antenna portion 10a is buried in the resin molding 12 with the terminal portions 14 and 16 sandwiched in the mold 35 (projections 38) as mentioned above, it is possible to restrict the height position of the line antenna portion 10a of the chip antenna accurately. It is therefore possible to suppress a variation in antenna characteristics that is originated from the height of the line antenna portion 10a of the chip antenna. This advantageously ensures mass-production of chip antennae with a stable quality.

The present invention is not limited to the above-described embodiments. For example, the dimensions or the like of the individual portions of the chip antenna have only to be determined according to the specification. It may be sufficient that the depths of the recesses 12f at the portions from which the terminal portions 14 and 16 are led out are set to about the thicknesses of the terminal portions 14 and 16 or set to the terminal lengths needed for solder.

The line antenna portion 10a may be secured by coupling the U turn portions of the antenna element to the side frames via the link portions and sandwiching the link portions in the mold too, as per the embodiment 1A.

Embodiment 3B

The antenna element 10 may be designed to have the line antenna portion 10a formed in a flat plate as well as the line antenna portion 10a formed by a meander conductor. Further, the two terminal portions 14 and 16 may be led out side by side from one end portion of the resin molding 12 instead of the type where the terminal portions 14 and 16 are led out from both lengthwise end portions of the resin molding 12. The terminals may be led out from longer sides of the resin molding 12.

The resin molding 12 may be made of a mixture of, for example, PPS (polyphenylene sulfide) and $BaO$—$Nd_2O_3$—$TiO_2$—$Bi_2O_3$ based ceramics power. The material which has a dielectric constant of about 20 may be used, depending on the specification of the antenna.

The above-described embodiments of the present invention bring about practically significant advantages, such as the ability to provide a chip antenna with a simple structure which has an excellent mechanical strength and can be made smaller without causing separation of the dielectric chip.

At the time of mounting the chip antenna with the above-described structure on a printed circuit board, applying heat to the chip antenna through, for example, a reflow furnace may cause cracks at those portions of the resin molding 12 from which the terminal portions 14 and 16 are led out due to a difference between the expansion coefficients of the antenna element 10 and the resin molding 12. The structures that will be discussed below can prevent the occurrence of such cracks.

Embodiment 4A

Figure 20:
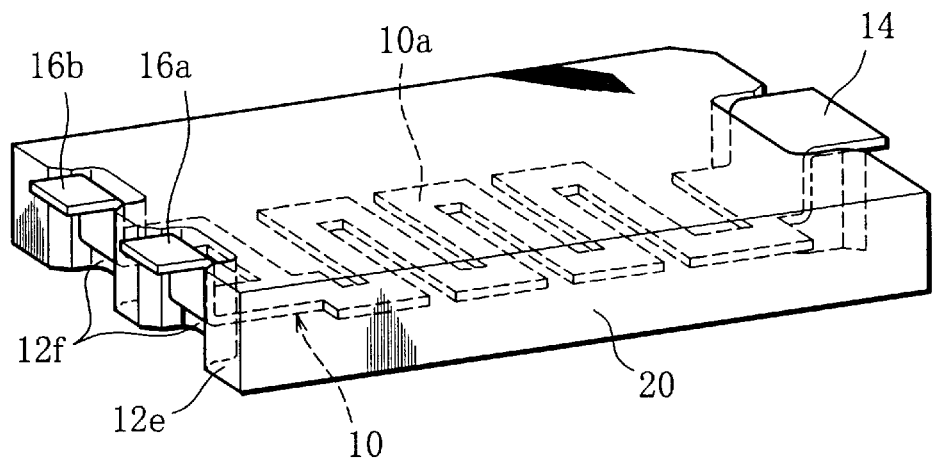
FIG. 20 is a perspective view depicting a chip antenna according to another embodiment 4A of the present invention as seen from the bottom side.
Figure 21:
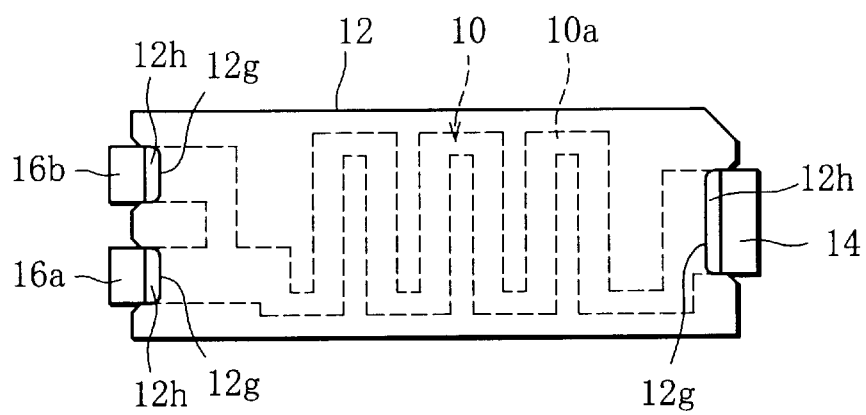
FIG. 21 is a plan view showing the chip antenna in FIG. 20 as seen from the bottom side.
Figure 22:
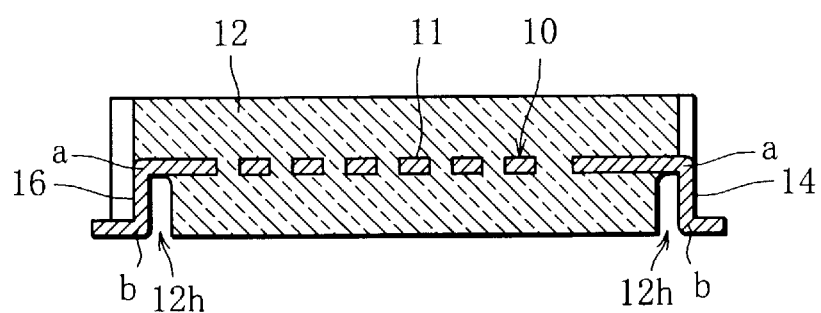
FIG. 22 is a cross-sectional view of the chip antenna shown in FIG. 20.
Figure 23:
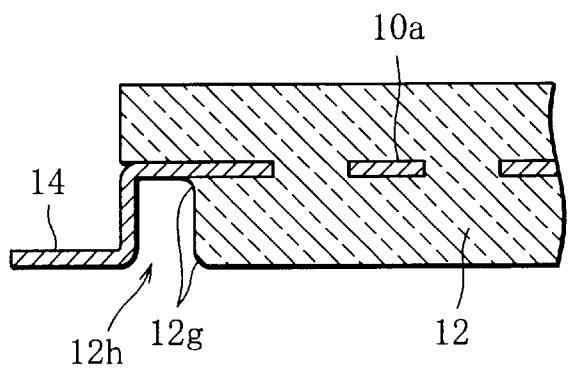
FIG. 23 is a partly cross-sectional view of a portion around a terminal portion of the chip antenna shown in FIG. 20.
Figure 24:
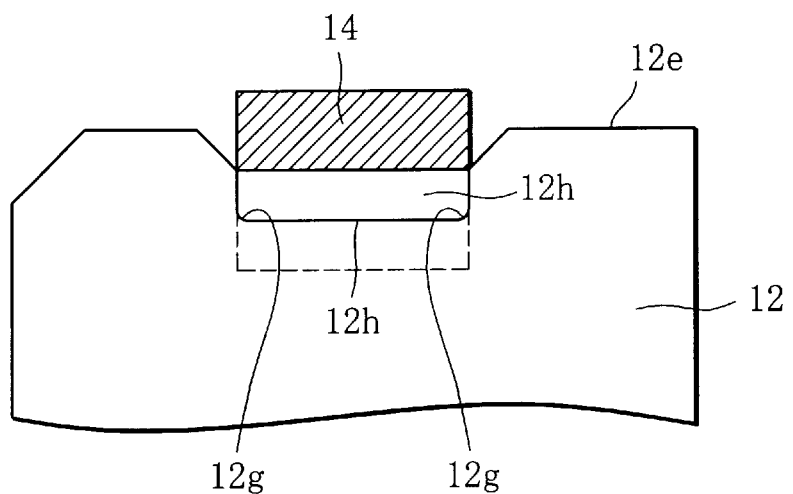
FIG. 24 is a plan view of the periphery of a terminal portion of the chip antenna shown in FIG. 20.

FIG. 20 is a perspective view depicting a chip antenna according to such an embodiment, FIG. 21 is a plan view of the chip antenna and FIG. 22 is a cross-sectional view of the chip antenna. FIGS. 23 and 24 are diagrams that show the cross-sectional structure and the planar structure of a portion around a terminal portion of the chip antenna shown in FIG. 20.

The antenna element 10 of the chip antenna comprises the line antenna portion 10a and the power supply terminal 14 and two fixed terminals 16a and 16b provided continuously to the end portions of the line antenna portion 10a. The line antenna portion boa is buried inside the resin molding 12 which has an approximately parallelepiped shape and the terminal portions 14, 16a and 16b are led out from the respective end portions of the resin molding 12.

The chip antenna is formed by holding the antenna element 10 in the mold 35 for injection molding and injecting a dielectric which is a mixture of a synthetic resin and ceramics powder.

The line antenna portion 10a comprises parallel lines that meander through several U turns as shown in, for example, FIG. 21 are provided with a predetermined pitch by patterning a predetermined conductive plate by punching, etching or the like. Specifically, the line antenna portion 10a is a conductive plate of, for example, 100 μm in thickness patterned to have 30 turns of line conductors which has a conductor width (line width) of 0.18 mm, a meander width of 8.7 mm and a meander pitch of 0.4 mm.

The terminal portions 14, 16a and 16b are those portions which extend from the end portions of the line antenna portion 10a over a predetermined length in the lengthwise direction of the line antenna portion 10a. In the embodiment, particularly, the terminal portions 14, 16a and 16b are bent downward in an L shape at the positions (first bending point a) where they are led out from the end portions of the resin molding 12, as shown in FIG. 22. The terminal portions 14, 16a and 16b are further bent outward in an L shape at the positions (second bending point b) where the attachment height of the line antenna portion 10a is defined, and thereby serve as hook-like legs of the line antenna portion 10a.

As shown in FIGS. 22 and 23, the resin molding 12 has a chip shape of an approximately parallelepiped in the center of which the line antenna portion 10a is buried along the antenna pattern surface formed by the line antenna portion 10a and from the end faces of which the terminal portions 14, 16a and 16b are led out. The chip antenna with an almost parallelepiped shape approximately has a width of 9.0 mm, a length of 16 mm and a thickness of 1.2 mm.

Groove portions 12h of a predetermined depth engraved with approximately the same widths as the widths of the terminal portions 14, 16a and 16b in the bottom of the resin molding 12 are provided between the resin molding 12 and the terminal portions 14, 16a and 16b provided on side surfaces 12e of the resin molding 12, as shown in FIGS. 23 and 24. Specifically, as shown in the cross-sectional structures in FIGS. 23 and 24, the groove portions 12h have such shapes as are engraved to those portions at which the terminal portions 14, 16a and 16b are bent downward in an L shape from the bottom of the resin molding 12. In particular, the wall surfaces and bottoms of the groove portions 12h are linked by round portions 12g having a predetermined radius of curvature so that the groove portions 12h have corner-less shapes.

Figure 25:
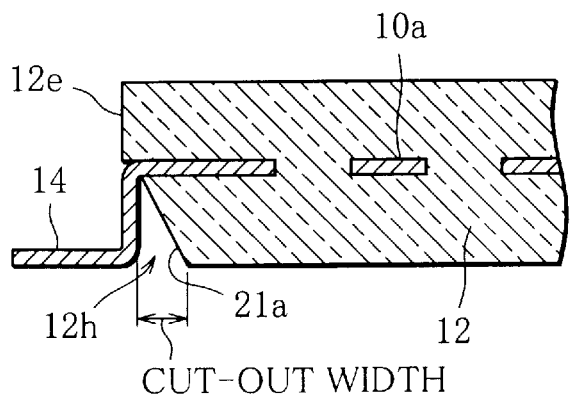
FIG. 25 is a cross-sectional view of a portion around a terminal portion showing a cut-out state provided in experimenting the crack-resistance of a chip antenna.

The present inventors observed how cracks would occur by changing the distances (cut-out widths) between the terminal portions 14, 16a and 16b and the resin molding 12 in order to check the effect of the groove portions 12h having the above-described structures (shapes). Specifically, a plurality of chip antennae (samples) whose groove portions 12h had the cut-out widths varied in a range of about 100 to 500 μm by making notches as shown in FIG. 25 were prepared and the occurrence of cracks after passing those chip antennae in a reflow furnace was observed. The results were classified in four levels as indicated in Table 1.

TABLE 1

| Level | Phenomenon | Occurrence of cracks |
| --- | --- | --- |
| 0 | No cracks | — |
| 1 | Small crack | Visible by careful observation |
| 2 | Medium-sized crack | Visible through stereoscope |
| 3 | Large crack | Extends to the side surface of the base |

Figure 26A:
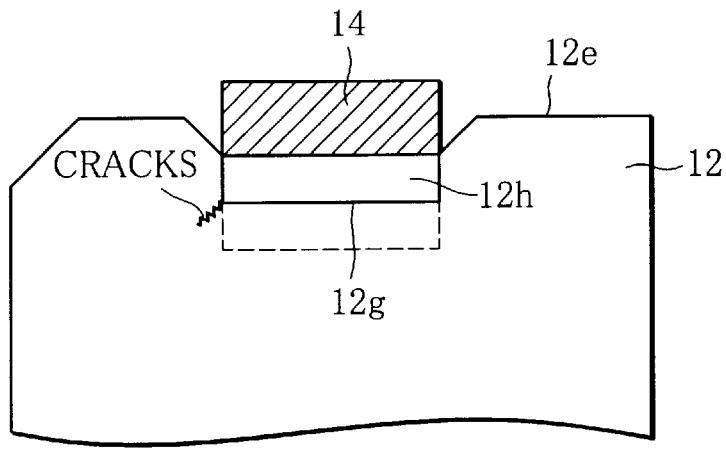
FIG. 26A is a diagram showing a small crack which has occurred in a chip antenna.
Figure 26B:
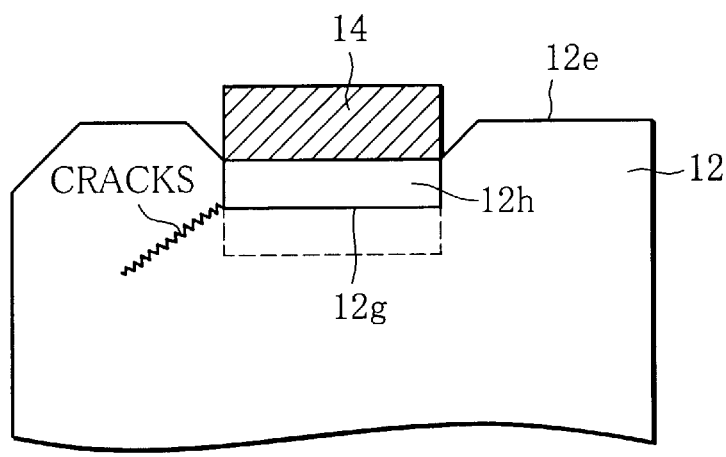
FIG. 26B is a diagram showing a medium-sized crack which has occurred in a chip antenna.
Figure 26C:
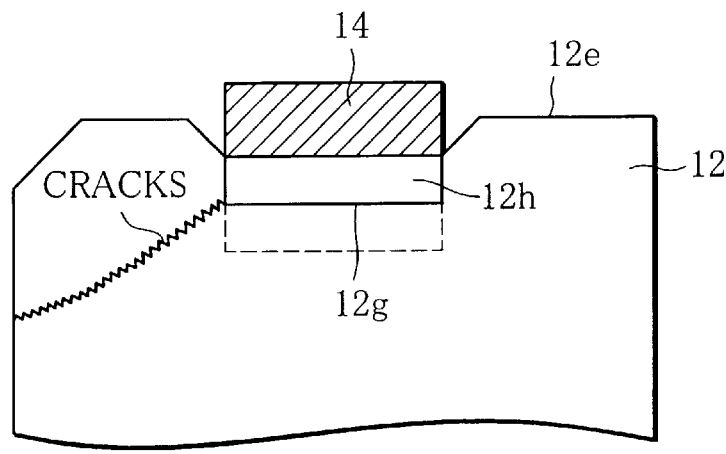
FIG. 26C is a diagram showing a large crack which has occurred in a chip antenna.

This experiment was conducted by heating the chip antennae (samples) three times for 30 seconds each using a reflow furnace at a maximum temperature of 250° C. The definitions of the sizes of cracks shown in Table 1 are as given in FIGS. 26A, 26B and 26C.

Figure 27A:
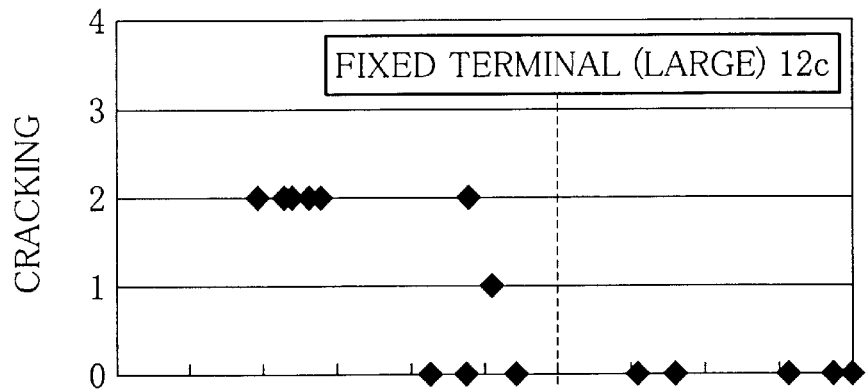
FIG. 27A is a diagram showing the results of an experiment on the crack resistance of a fixed terminal (large) side of a chip antenna.
Figure 27B:
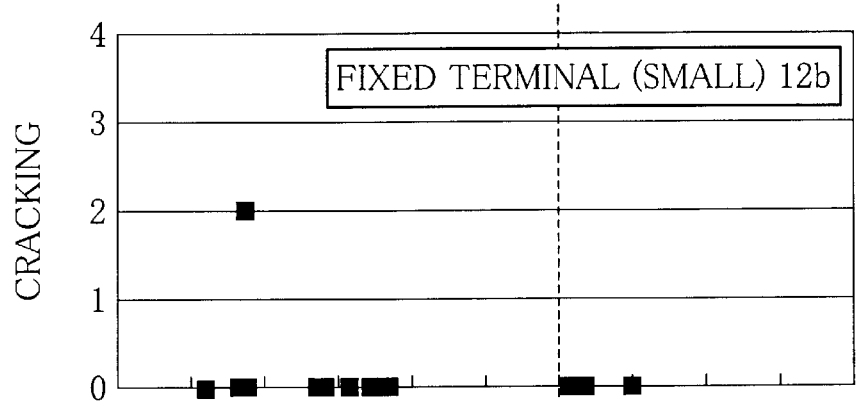
FIG. 27B is a diagram showing the results of an experiment on the crack resistance of a fixed terminal (small) side of a chip antenna.
Figure 27C:
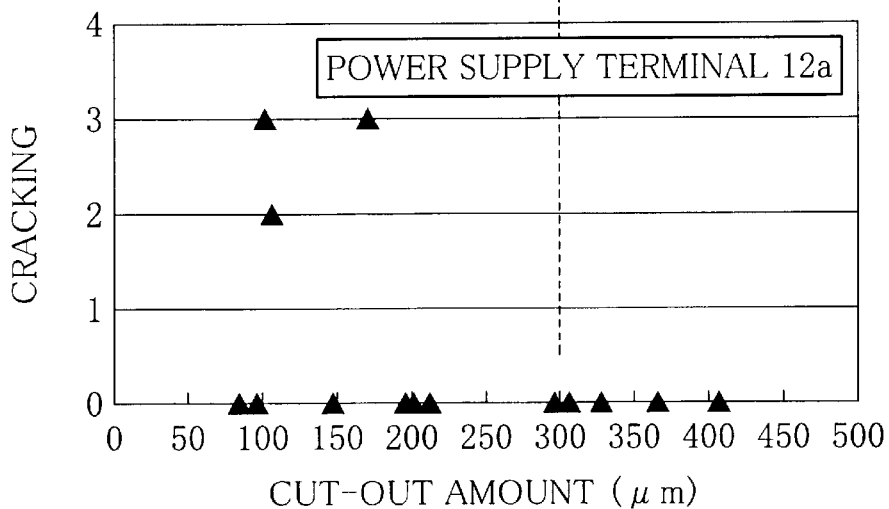
FIG. 27C is a diagram showing the results of an experiment on the crack resistance of a power supply terminal side of a chip antenna.

FIGS. 27A, 27B and 27C are diagrams showing the results of the experiment and Table 2 below shows a list of the experimental results.

TABLE 2

| | Fixed terminal 16a | | Fixed terminal 16b | | Power supply terminal 14 | |
| --- | --- | --- | --- | --- | --- | --- |
| Samples | Cut-out width [μm] | Level | Cut-out width [μm] | Level | Cut-out width [μm] | Level |
| 1 | 138 | 2 | 138 | 0 | 170 | 3 |
| 2 | 96 | 2 | 88 | 2 | 85 | 0 |
| 3 | 131 | 2 | 86 | 0 | 106 | 2 |
| 4 | 114 | 2 | 89 | 0 | 97 | 0 |
| 5 | 119 | 2 | 62 | 0 | 101 | 3 |
| 6 | 239 | 2 | 160 | 0 | 196 | 0 |
| 7 | 214 | 0 | 175 | 0 | 203 | 0 |
| 8 | 273 | 0 | 184 | 0 | 199 | 0 |
| 9 | 256 | 1 | 188 | 0 | 213 | 0 |
| 10 | 239 | 0 | 142 | 0 | 149 | 0 |
| 11 | 382 | 0 | 321 | 0 | 407 | 0 |
| 12 | 488 | 0 | 321 | 0 | 298 | 0 |
| 13 | 500 | 0 | 311 | 0 | 308 | 0 |
| 14 | 457 | 0 | 317 | 0 | 329 | 0 |
| 15 | 356 | 0 | 353 | 0 | 367 | 0 |

From the experimental results, the inventors concluded that no cracks would occur if the cut-out width was set to 300 μm or greater. That is, it was concluded that cracks would be less likely to occur if gaps of about 300 μm or greater were provided between the terminal portions 14, 16a and 16b and the end faces 12e of the resin molding 12.

The feature of the chip antenna according to the embodiment lies in that the groove portions 12h engraved with approximately the same widths as the widths of the terminal portions 14, 16a and 16b in the bottom of the resin molding 12 are provided between the resin molding 12 and the terminal portions 14, 16a and 16b provided on the resin molding 12. That is, the groove portions 12h having an approximately parallelepiped shape that are engraved with approximately the same widths as the widths of the terminal portions 14, 16a and 16b are provided on the end faces 12e of the resin molding 12 from which the terminal portions 14, 16a and 16b are led out, from the bottom side of the resin molding 12 to the first bending point a of the terminal portions 14, 16a and 16b. At this time, the contact areas between the terminal portions 14, 16a and 16b and the resin molding 12 are made smaller as mentioned above. This structure can significantly decrease the stress which is applied to the portions of the resin molding 12 where the terminal portions 14, 16a and 16b are led out, due to the thermal stretching of the terminal portions 14, 16a and 16b at the time of reflowing the chip antenna.

That is, the contact areas between the terminal portions 14, 16a and 16b and the resin molding 12 are made smaller by the groove portions 12h according to the embodiment. Even if the expansion coefficient of the terminal portions 14, 16a and 16b differs from the expansion coefficient of the resin molding 12, therefore, the stress which is applied to the terminal-portions leading portions of the resin molding 12 at the time of applying heat to the chip antenna can be reduced. This can effectively prevent the occurrence of cracks in the resin molding 12.

Even if there is residual stress at the interface between the resin molding 12 and the terminal portions 14, 16a and 16b due to the injection molding of the resin molding 12, the stress can be let to escape to the groove portions 12h. In this respect, therefore, the stress applied to the resin molding 12 can be reduced significantly. It is thus possible to prevent the occurrence of cracks and the separation of the resin molding 12 from the antenna element.

Embodiment 4B

If the corners 12g of the groove portions 12h are rounded as shown in FIGS. 23 and 24, cracks that may occur in the resin molding 12 can be restrained. That is, if the groove portions 12h of the resin molding 12 have square corners, stress is likely to be concentrated on the corners, making it easy to cause cracks. It is therefore effective to round the corners 21g of the groove portions 12h, thereby preventing the concentration of stress.

With the above-described structure, even if the terminal portions 14, 16a and 16b are deformed by external force (stress) applied to the chip antenna after the chip antenna is mounted on a printed circuit board, the groove portions 12h absorb the deformation of the terminal portions 14, 16a and 16b. As a result, the stress originated from the deformation of the terminal portions 14, 16a and 16b will not be applied to the resin molding 12. This can also prevent problems, such as the occurrence of cracks and the separation of the resin molding 12.

Embodiment 4C

The present invention is not limited to the above-described embodiments. For example, the mounting area of the chip antenna on a printed circuit board can be made smaller by bending the terminal portions 14, 16a and 16b inward along the bottom of the resin molding 12. The antenna element 10 may be designed to have the line antenna portion 10a formed in a flat plate as well as the line antenna portion 10a formed by a meander conductor.

The material for the resin molding 12 may be a mixture of, for example, PPS (polyphenylene sulfide) and BaO—$Nd_2O_3$—$TiO_2$—$Bi_2O_3$ based ceramics power. The material which has a dielectric constant of about 20 may be used, depending on the specification of the antenna.

Invention That can be Grasped From the Embodiments

The following invention can be grasped from the above-described embodiments.

(1) A chip antenna is designed in such a way that of margins of the resin molding around an antenna element buried in a resin molding, a margin on that side of the resin molding where an injection molding originated gate mark remains is larger than margins on other sides where there is no gate mark. A "margin" of the resin molding mentioned here means an area which does not substantially overlap the antenna element at the peripheral portion of the resin molding as seen planarly.

In case where the antenna element has a line antenna portion and a capacitance-adding portion provided at the distal end of the line antenna portion, the resin molding 12 is preferably injection-molded in such a way that gate mark is formed on the capacitance-adding portion side of the antenna element.

This structure can set the distance from the antenna element to the gate mark longer, so that the influence of the projections or indents of the gate mark on the antenna characteristics can be decreased. The structure can also reduce the stress applied to the interface between the antenna element and the resin molding.

(2) Another chip antenna has a structure where an antenna element is buried in a resin molding having a predetermined chip shape and terminal portions provided continuously to the antenna element protrude from the resin molding. Particularly, the chip antenna is characterized in that those portions of the resin molding with the predetermined chip shape where the terminal portions are led out are dented from levels of portions around those portions.

It is preferable that the terminal portions should be led out from the end portions of the resin molding having the predetermined chip shape and be bent toward the bottom of the resin molding, and the resin molding should have groove portions engraved in the bottom of the resin molding between the terminal portions located at the side surfaces of the resin molding.

It is also preferable that the groove portions should have approximately rectangular cross sections with rounded corners.

Because this structure can enlarge a resin molding area (margins) around those portions of the resin molding from which the terminal portions protrude, it is possible to increase the mechanical strength for receiving the stress applied to the resin molding from the terminal portions. This can prevent separation of the resin molding and cracks from being formed thereon.

(3) A method of manufacturing a chip antenna sandwiches those portions of terminal portions provided continuously to an antenna element which are led out from a resin molding between an upper die and a lower die of a mold for injection molding, positions the antenna element in a cavity of the mold and then injects a dielectric into the cavity to bury the line antenna portion with the dielectric. Particularly, the method uses the mold that is designed in such a way that those portions of the mold which sandwich the terminal portions from above and below are so shaped as to protrude toward the cavity.

(4) According to another method of manufacturing a chip antenna, a dielectric is injected into the cavity from outward of the capacitance-adding portion as seen from a center of the antenna element. It is preferable that the dielectric should be injected from that portion which does not overlap the link portion between the distal edge of the capacitance-adding portion and the antenna element holding frame. It is more preferable that the dielectric should be injected from a corner of the cavity at which the distal edge of the capacitance-adding portion is positioned.

When one end side of the antenna element forms a meander line with a narrow line width and the other end side forms a meander line with a wide line width, particularly, injection of the dielectric into the cavity is carried out from that side of the meander line with the wide line width. Alternatively, when one end side of the antenna element forms a meander line with a narrow pitch and the other end side forms a meander line with a wide pitch, injection of the dielectric into the cavity is carried out from that side of the meander line with the wide pitch. When one end side of the antenna element line forms a meander line having a narrow line width and a narrow pitch and the other end side forms a meander line having a wide line width and a wide pitch, injection of the dielectric into the cavity is carried out from that side of the meander line with the wide line width and the wide pitch.

This method can provide a chip antenna whose characteristics are not influenced by the state of a gate mark remaining on the resin molding. The method can also provide a chip antenna which does not cause separation of the resin molding or cracking in the resin molding. It is further possible to easily manufacture a chip antenna with stable characteristics.

Further, the strong flow of the dielectric material near the gate portion is rectified by the capacitance-adding portion that has a large area (which means a high mechanical strength). This makes it difficult to deform the antenna element. Because the dielectric material for the gate portion does not overlap the link portion that links the capacitance-adding portion to the frame, it is easy to cut the gate portion projection after molding.

Because burrs left after cutting the gate portion projection do not protrude from the end faces of the dielectric molding according to the present invention, the size precision of the dielectric molding can be improved.

What is claimed is:

1. A chip antenna comprising:
   a metal antenna element formed into a desired line pattern shape; and
   a resin molding injection-molded with said antenna element buried therein,
   wherein of margins of said resin molding around said antenna element, a margin on that side of said resin molding where an injection molding originated gate mark remains is larger than margins on other sides where there is no gate mark.

2. The chip antenna according to claim 1, wherein said antenna element has a line antenna portion and a capacitance-adding portion provided at a distal end of said line antenna portion, and said resin molding is injection-molded in such a way that a gate mark can be formed on one side of said antenna element on that side where said capacitance-adding portion is located.

3. A chip antenna comprising:

a resin molding having a predetermined chip shape;

an antenna element buried in said resin molding; and terminal portions provided continuously to said antenna element and protruding from said resin molding, wherein said resin molding in the shape of the predetermined chip has dented portions where said terminal portions are led out.

4. The chip antenna according to claim 3, wherein said antenna element has said terminal portions provided continuously to end portions of a line antenna portion having a predetermined pattern shape, and said resin molding has an approximately rectangular parallelepiped in a center of which said line antenna portion is buried along an antenna pattern plane formed by said line antenna portion, and the portions where said terminal portions are led out from said resin molding with said predetermined chip share are dented from levels of end faces from which said terminal portions are led out.

5. The chip antenna according to claim 3, wherein said terminal portions are led out from end portions of said resin molding with said predetermined chip shape and are bent downward of said resin molding, and said resin molding has a groove portion engraved between said terminal portions positioned at side surfaces of said resin molding from a bottom side of said resin molding.

6. The chip antenna according to claim 5, wherein said groove portion has an approximately rectangular cross section with side portions rounded.

7. A method of manufacturing a chip antenna whose antenna element has a capacitance-adding portion at a distal end of a line antenna portion and is buried in a resin molding having a predetermined chip shape, comprising the step of:

sandwiching frame portions at both sides of said antenna element between an upper die and a lower die of a mold for injection molding, positioning said line antenna portion and said capacitance-adding portion in a cavity of said mold and then injecting a dielectric into said cavity from outward of said capacitance-adding portion as seen from a center of said antenna element.

8. The method according to claim 7, wherein injection of said dielectric into said cavity is carried out from that portion which does not overlap a link portion of a distal edge of said capacitance-adding portion and a frame for holding said antenna element.

9. The method according to claim 8, wherein injection of said dielectric is carried out from that corner portion of said cavity where a distal edge side of said capacitance-adding portion is positioned.

10. The method according to claim 7, wherein when one end side of said line antenna portion forms a meander line with a narrow line width and the other end side of said line antenna portion forms a meander line with a wide line width, injection of said dielectric into said cavity is carried out from that side of said meander line with said wide line width.

11. The method according to claim 7, wherein when one end side of said line antenna portion forms a meander line with a narrow pitch and the other end side of said line antenna portion forms a meander line with a wide pitch, injection of said dielectric into said cavity is carried out from that side of said meander line with said wide pitch.

12. The method according to claim 7, wherein when one end side of said line antenna portion forms a meander line having a narrow line width and a narrow pitch and the other end side of said line antenna portion forms a meander line having a wide line width and a wide pitch, injection of said dielectric into said cavity is carried out from that side of said meander line with said wide line width and said wide pitch.

13. A method of manufacturing a chip antenna which has an antenna element buried in a resin molding having a predetermined chip shape and terminal portions provided continuously to said antenna element and protruding from said resin molding, comprising the steps of:

sandwiching portions of said terminal portions between an upper die and a lower die of a mold for injection molding, and positioning a line antenna portion in a cavity of said mold and then injecting a dielectric into said cavity to bury said antenna element, wherein said upper die and said lower die of said mold for injection molding sandwich a conductive pattern, thereby forming a cavity having a shape of an approximately rectangular parallelepiped, and said upper die and said lower die are shaped to have portions protruding into said cavity and sandwiching said terminal portions of said conductive pattern.

14. The method according to claim 13, further comprising the step of cutting said terminal portions protruding from said resin molding to a predetermined length.

* * * * *